US010540990B2

(12) United States Patent
Suzuki et al.

(10) Patent No.: US 10,540,990 B2
(45) Date of Patent: Jan. 21, 2020

(54) PROCESSING OF SPEECH SIGNALS

(71) Applicant: International Business Machines Corporation, Armonk, NY (US)

(72) Inventors: Masayuki Suzuki, Tokyo (JP); Takashi Fukuda, Yokohama (JP); Toru Nagano, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 15/800,112

(22) Filed: Nov. 1, 2017

(65) Prior Publication Data
US 2019/0130932 A1 May 2, 2019

(51) Int. Cl.
 G10L 21/06 (2013.01)
 G10L 25/24 (2013.01)
 G10L 15/01 (2013.01)
 G10L 15/26 (2006.01)

(52) U.S. Cl.
 CPC ............ *G10L 25/24* (2013.01); *G10L 15/01* (2013.01); *G10L 15/26* (2013.01); *G10L 21/06* (2013.01)

(58) Field of Classification Search
 CPC ...................................................... G10L 21/06
 See application file for complete search history.

(56) References Cited

U.S. PATENT DOCUMENTS

| 5,583,961 | A  | * | 12/1996 | Pawlewski | G10L 17/02 |
|           |    |   |         |           | 704/205 |
| 7,778,828 | B2 |   | 8/2010  | Ghanekar et al. | |
| 2003/0204398 | A1 | * | 10/2003 | Haverinen | G10L 15/20 |
|           |    |   |         |           | 704/233 |
| 2005/0182621 | A1 | * | 8/2005 | Zlokarnik | G10L 15/02 |
|           |    |   |         |           | 704/224 |
| 2007/0208562 | A1 | * | 9/2007 | Jeong | G10L 15/02 |
|           |    |   |         |           | 704/234 |
| 2009/0299741 | A1 | * | 12/2009 | Chittar | G10L 51/01 |
|           |    |   |         |           | 704/233 |
| 2013/0024193 | A1 |   | 1/2013 | Yeldener et al. | |
| 2013/0329912 | A1 |   | 12/2013 | Krishnaswamy et al. | |
| 2014/0329511 | A1 | * | 11/2014 | Vesa | H04M 3/569 |
|           |    |   |         |           | 455/416 |
| 2016/0099007 | A1 |   | 4/2016 | Alvarez et al. | |

OTHER PUBLICATIONS

Khing et al., "The Effect of Automatic Gain Control Structure and Release Time on Cochlear Implant Speech Intelligibility", Published: Nov. 28, 2013, © 2013 Khing et al., 21 pages, <http://journals.plos.org/plosone/article?d=10.1371/journal.pone.0082263>.

(Continued)

*Primary Examiner* — Feng-Tzer Tzeng
(74) *Attorney, Agent, or Firm* — Nicholas L. Cadmus; William H. Hartwell

(57) ABSTRACT

A method for processing a speech signal. The method comprises obtaining a logmel feature of a speech signal. The method further includes one or more processors processing the logmel feature so that the logmel feature is normalized under a constraint that a power level of the logmel feature is kept as originally obtained. The method further includes inputting the processed logmel feature into a speech-to-text system to generate corresponding text data.

17 Claims, 3 Drawing Sheets

(56) References Cited

OTHER PUBLICATIONS

Prabhavalkar et al. "Automatic Gain Control and Multi-Style Training for Robust Small-Footprint Keyword Spotting with Deep Neural Networks", 5 pages.
"Voice Enhancement Automatic Gain Control", Alango Technologies and solutions, © 2006-2017 Alango Technologies Ltd. All Rights Reserved, Printed Jun. 15, 2017 9:46 AM, 2 pages, <http://www.alango.com/technologies-drc.php>.

* cited by examiner

PROCESSING OF SPEECH SIGNALS

BACKGROUND

The present invention, generally, relates to processing a speech signal, more particularly, to processing speech signals for speech-to-text (STT) systems.

Recently, a deep neural network (DNN) have come into use instead of a Gaussian mixture model (GMM) as an acoustic model. Along with the use of the DNN, logmel features as features of the speech signal have come into use as inputs of STT systems instead of Mel Frequency Cepstrum Coefficient (MFCC) features.

SUMMARY

According to an embodiment of the present invention, there is provided a method for processing a speech signal. The method comprises obtaining a logmel feature of a speech signal. The method further includes one or more processors processing the logmel feature so that the logmel feature is normalized under a constraint that a power level of the logmel feature is kept as originally obtained. The method further includes inputting the processed logmel feature into a speech-to-text system to generate corresponding text data.

According to another embodiment of the present invention, there is provided a system for processing a speech signal. The system comprises one or more processors, one or more computer readable storage media, and program instructions stored on the computer readable storage media for execution by at least one of the one or more processors. The program instructions comprise program instructions to obtain a logmel feature of a speech signal, program instructions to process the logmel feature so that the logmel feature is normalized under a constraint that a power level of the logmel feature is kept as originally obtained, and program instructions to input the processed logmel feature into a speech-to-text system to generate corresponding text data.

According to yet another embodiment of the present invention, there is provided a computer program product for processing a speech signal. The computer program product comprises one or more computer readable storage media and program instructions stored on the one or more computer readable storage media. The program instructions comprise program instructions to obtain a logmel feature of a speech signal, program instructions to process the logmel feature so that the logmel feature is normalized under a constraint that a power level of the logmel feature is kept as originally obtained, and program instructions to input the processed logmel feature into a speech-to-text system to generate corresponding text data.

DETAILED DESCRIPTION

Figure 1:
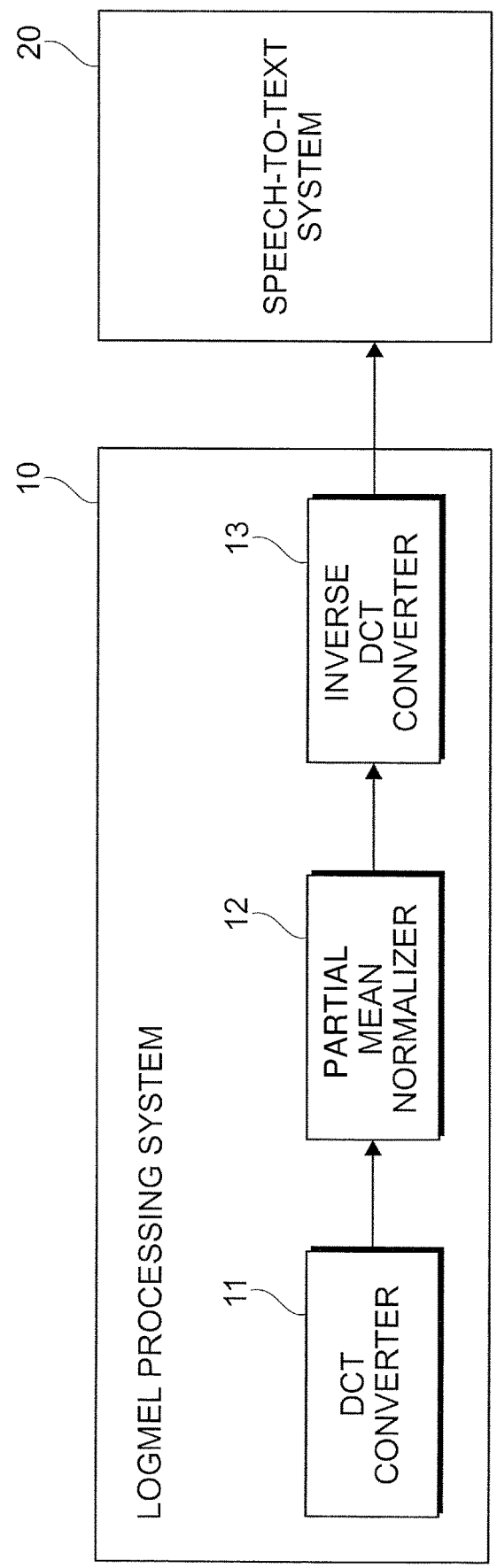
FIG. 1 depicts a block diagram of a system according to a preferred exemplary embodiment of the present invention.

Hereinafter, exemplary embodiments of the present invention will be described in detail with reference to the attached figures.

It is to be noted that the present invention is not limited to these exemplary embodiments to be given below and may be implemented with various modifications within the scope of the present invention. In addition, the figures used herein are for purposes of illustration, and may not show actual dimensions.

When a speech signal uttered by a speaker and captured by a microphone is recorded as an input to a speech-to-text system, a power level of the recorded speech signal may be dynamically changed depending on a distance between the speaker and the microphone. For example, if the recorded speech signal is split into segments including utterances by one speaker, the power level of the speech signal may be changed because a distance between the speaker and the microphone may vary due to body movements of the speaker. Meanwhile, if the recorded speech signal is split into segments including utterances by more than one speaker, the power level of the speech signal may be changed because distances between the speakers and the microphone may differ due to positions of the speakers. These changes of the power level may often degrade performance of the speech-to-text system.

On the other hand, normalization of logmel features of the speech signal is desired in order to improve performance of the speech-to-text system. The normalization may be defined as a process of changing the logmel features so that a statistic of the logmel features over frames is set to a predetermined value.

In view of this, exemplary embodiments of the present invention may normalize the logmel features under a constraint that a power level of the logmel feature is kept as is. This is to prevent adverse effects caused by normalizing a power level of the logmel feature. The adverse effect may be, for example, over-subtraction of the logmel features of some speech parts where power levels are relatively low depending on the distance between the speaker and the microphone.

Specifically, exemplary embodiments may convert the logmel features into lossless Mel Frequency Cepstrum Coefficients (MFCCs), and may normalize a statistic of features over frames for each of the coefficients of the lossless MFCCs other than a coefficient corresponding to the power level. This coefficient corresponding to the power level may be the first coefficient (the coefficient 0) of the lossless MFCCs.

The lossless MFCCs may be calculated using the formula "lossless_MFCC=DCT (logmel)". The variables "lossless_MFCC" and "logmel" denote a lossless_MFCC and a logmel feature, respectively, and the function "DCT" represents a discrete cosine transformation (DCT) operation for the logmel feature. This formula indicates an invertible transformation.

Subsequently, MFCCs may be calculated using the formula "MFCC=F (lossless_MFCC)". The variable "MFCC" denotes an MFCC, and the function "F" represents an operation which reduces dimensions of the lossless_MFCC. This formula indicates a non-invertible transformation.

That is, the lossless MFCCs, which are used to normalize a statistic of features over frames for each of coefficients other than a coefficient corresponding to the power level of the speech signal, are coefficients obtained immediately after the DCT operation has been performed for the logmel features.

Referring to FIG. 1, there is shown a system to which a preferred exemplary embodiment is applied. As shown in FIG. 1, this system may include logmel processing system 10 and speech-to-text system 20. Logmel processing system 10 may process the logmel features of the speech signal so that an original power of the speech signal is kept while mean normalization is performed for the logmel features. The mean normalization may be defined as a process of changing the logmel features so that a mean over frames of the logmel features is set to a predetermined value. Speech-to-text system 20 may accept partially normalized logmel features as an input, and may perform conversion from the speech signal to text data using the partially normalized logmel features.

Specifically, logmel processing system 10 may include DCT converter 11, partial mean normalizer 12, and inverse DCT converter 13.

DCT converter 11 may obtain the logmel features of the speech signal, and may perform a DCT operation to convert the logmel features into lossless MFCCs. Note that the logmel features may be generated from the speech signal by the following processing. First, the speech signal may be divided into frames using a window function. Secondly, a discrete Fourier transform (DFT) of the speech signal may be performed to obtain a power spectrum for each frame. Thirdly, the power spectrum may be converted into a logmel feature using a mel filter bank for each frame.

Partial mean normalizer 12 may normalize a mean of features over frames for each of coefficient of the lossless MFCCs except for the coefficient corresponding to the power level. This coefficient corresponding to the power level may be the first coefficient (the coefficient 0) of the lossless MFCCs. For example, assuming that the features $X_1, X_2, \ldots, X_n$ have been observed in frames $F_1, F_2, \ldots, F_n$, respectively, in any of the coefficients other than the coefficient corresponding to the power level (e.g., the first coefficient, coefficient 0), partial mean normalizer 12 may change the features $X_1, X_2, \ldots, X_n$ so that a mean of them becomes equal to a predetermined value (e.g., "0"). Meanwhile, partial mean normalizer 12 may not normalize a mean of features over frames for the first coefficient corresponding to the original power of the speech signal. Thus, the partial mean normalizer 12 may obtain partially normalized lossless MFCCs.

Inverse DCT converter 13 may perform inverse DCT operation to convert the partially normalized lossless MFCCs into partially normalized logmel features, and may input the partially normalized logmel features into speech-to-text system 20.

Next, operations of the system according to the preferred exemplary embodiment are described.

Figure 2:
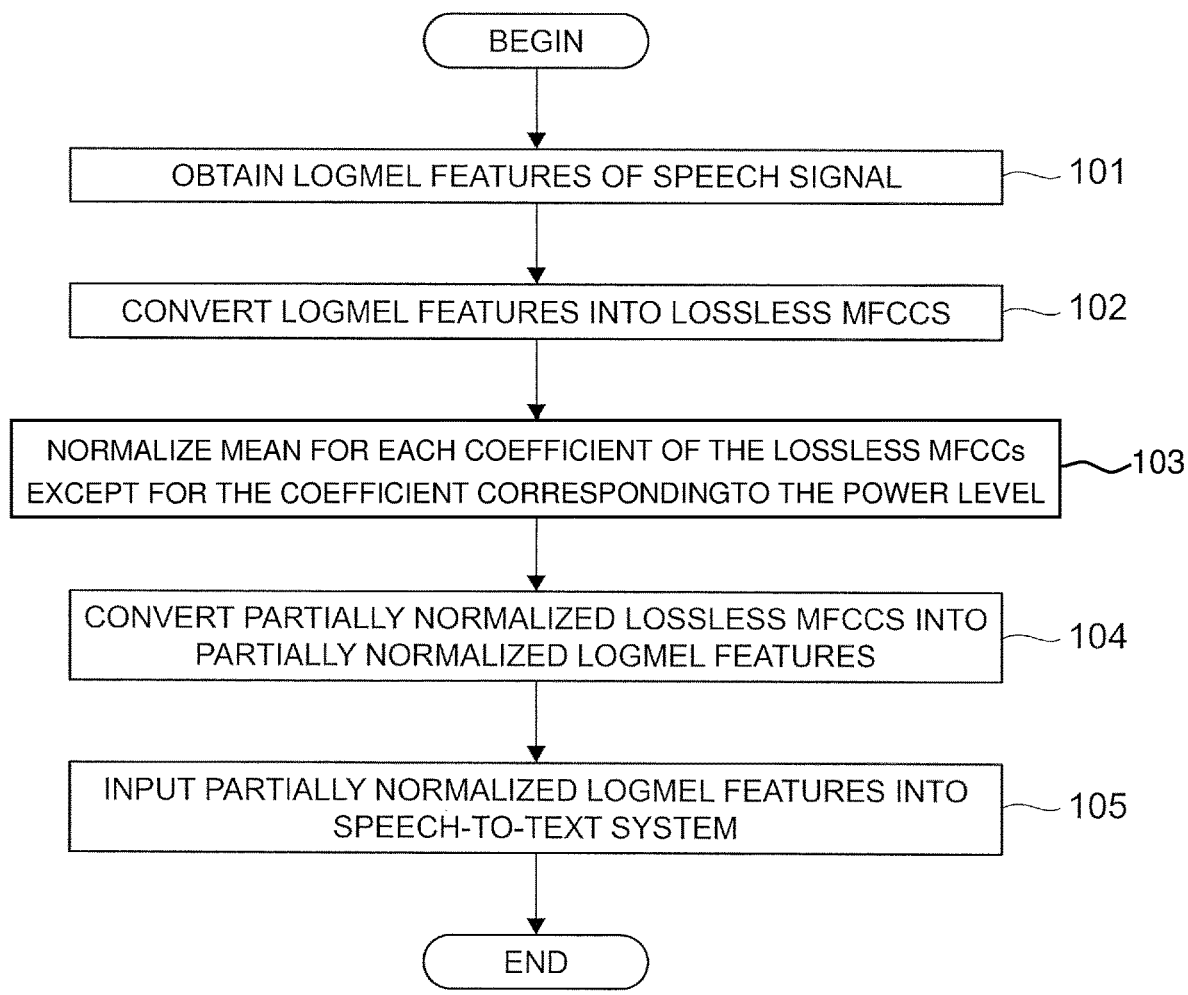
FIG. 2 depicts a flowchart representing an example of an operation of a logmel processing system according to the preferred exemplary embodiment of the present invention.

Referring to FIG. 2, there is shown a flowchart representing an example of an operation of logmel processing system 10 according to the preferred exemplary embodiment.

As shown in FIG. 2, DCT converter 11 may first obtain logmel features of the speech signal (step 101). Then, DCT converter 11 may convert the obtained logmel features into lossless MFCCs (step 102). Thus, the lossless MFCCs may be output to partial mean normalizer 12.

Next, partial mean normalizer 12 may normalize a mean of features over frames for each coefficient of the lossless MFCCs except for the coefficient corresponding to the power level (step 103). This coefficient corresponding to the power level may be the first coefficient (the coefficient 0) of the lossless MFCCs. That is, partial mean normalizer 12 may not normalize a mean of features over frames for the first coefficient of the lossless MFCCs. As mentioned above, the first coefficient may correspond to the original power of the speech signal. Thus, partially normalized lossless MFCCs may be output to inverse DCT converter 13. In this preferred exemplary embodiment, the partially normalized lossless MFCCs may indicate lossless MFCCs for which mean normalization has been partially performed.

Subsequently, inverse DCT converter 13 may convert the partially normalized lossless MFCCs into partially normalized logmel features (step 104). In this preferred exemplary embodiment, the partially normalized logmel features may indicate logmel features for which mean normalization has been partially performed. Then, inverse DCT converter 13 may input the partially normalized logmel features into speech-to-text system 20 (step 105).

After that, speech-to-text system 20 may accept the partially normalized logmel features, and may perform conversion from the partially normalized logmel features to text data.

Note that steps 101 to 105 may be performed in either one of a case where the speech signal is given as data for testing speech-to-text system 20 and a case where the speech signal is given as data for training speech-to-text system 20. Alternatively, steps 101 to 105 may be performed both in a case where the speech signal is given as data for testing speech-to-text system 20 and in a case where the speech signal is given as data for training speech-to-text system 20.

Next, hardware configurations of DCT converter 11, partial mean normalizer 12, and inverse DCT converter 13 in logmel processing system 10 are described. Note that DCT converter 11, partial mean normalizer 12, and inverse DCT converter 13 have the same hardware configuration, so the description will be for the hardware configuration of computer 90.

Figure 3:
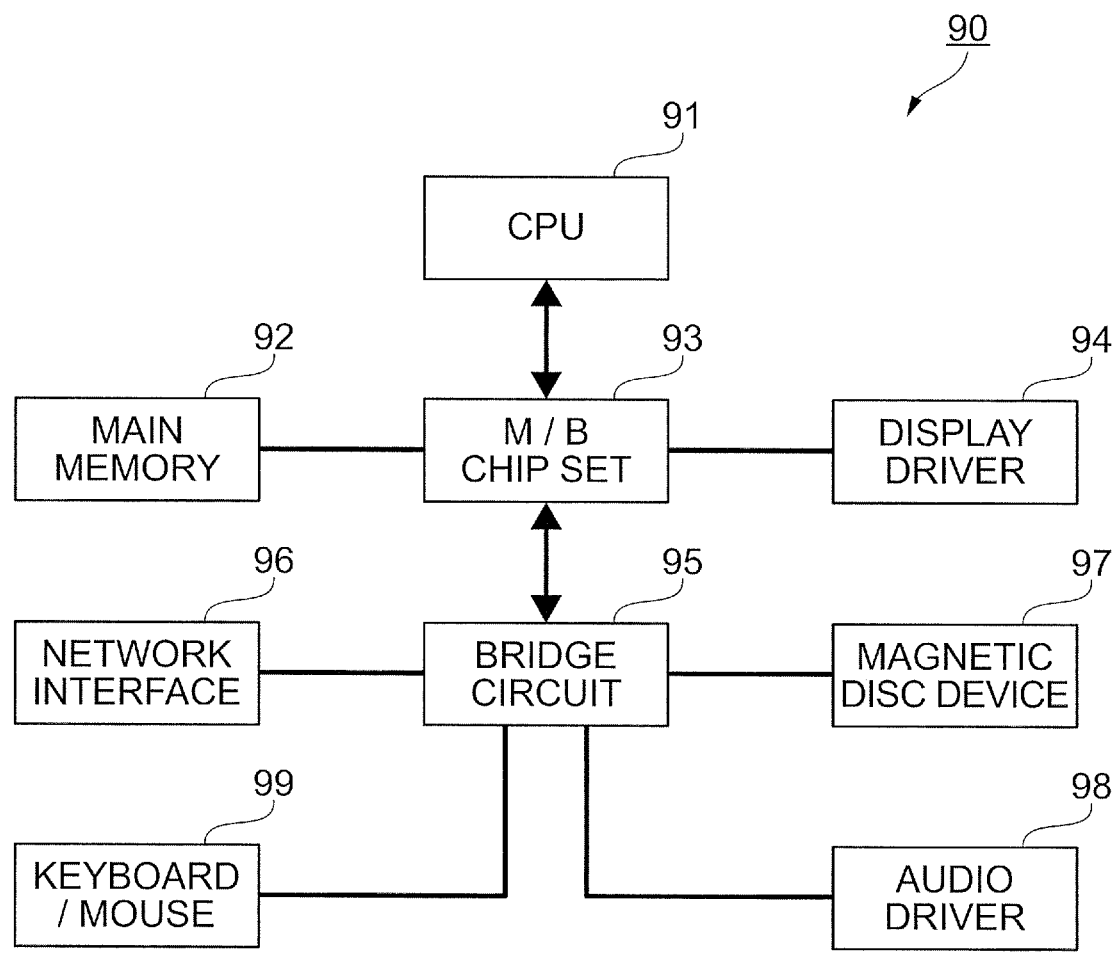
FIG. 3 depicts an example of a hardware configuration of a computer applicable to the logmel processing system according to the preferred exemplary embodiment of the present invention.

Referring to FIG. 3, there is shown an example of the hardware configuration of computer 90. As shown in FIG. 3, computer 90 may include central processing unit (CPU) 91 serving as one example of a processor, main memory 92 connected to CPU 91 via motherboard (M/B) chip set 93 and serving as one example of a memory, and display driver 94 connected to CPU 91 via M/B chip set 93. Network interface 96, magnetic disk device 97, audio driver 98, and keyboard/mouse 99 are also connected to M/B chip set 93 via bridge circuit 95.

In FIG. 3, the various configurational elements are connected via buses. For example, CPU 91 and M/B chip set 93, and M/B chip set 93 and main memory 92 are connected via CPU buses, respectively. Also, M/B chip set 93 and display driver 94 may be connected via an accelerated graphics port (AGP). However, when display driver 94 includes a peripheral components interconnect (PCI) express-compatible video card, M/B chip set 93 and the video card are connected via a PCI express (PCIe) bus. Also, when network interface 96 is connected to bridge circuit 95, a PCI Express may be used for the connection, for example. For connecting magnetic disk device 97 to bridge circuit 95, a serial AT attachment (ATA), a parallel-transmission ATA, or PCI may be used. For connecting keyboard/mouse 99 to bridge circuit 95, a universal serial bus (USB) may be used.

Next, an alternative exemplary embodiment will be described. Although mean normalization is assumed as normalization of the logmel features in the preferred exemplary embodiment, variance normalization may be assumed as normalization of the logmel features in the alternative exemplary embodiment.

Specifically, in the alternative exemplary embodiment, logmel processing system 10 may include a partial variance normalizer instead of partial mean normalizer 12. The partial variance normalizer may normalize a variance of features over frames for each coefficient of the lossless MFCCs except for the coefficient corresponding to the original power of the speech signal.

Further, in the alternative exemplary embodiment, a variance normalization step may be performed instead of the mean normalization in step 103. At the variance normalization step, the partially variance normalizer may normalize a variance of features over frames for each coefficient of the lossless MFCCs except for the coefficient corresponding to the original power of the speech signal. That is, the partially variance normalizer may not normalize a variance of features over frames for the first coefficient of the lossless MFCCs. As mentioned above, the first coefficient may correspond to the original power of the speech signal. Thus, partially normalized lossless MFCCs may be output to the inverse DCT converter 13. In this alternative exemplary embodiment, the partially normalized lossless MFCCs may indicate lossless MFCCs for which variance normalization has been partially performed.

Note that, in the alternative exemplary embodiment, any normalization other than the mean normalization and the variance normalization may be performed as normalization of the logmel features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, the method comprising:
   obtaining a logmel feature of a speech signal, wherein the speech signal includes utterances by a first speaker and utterances by a second speaker, wherein a power level of the logmel feature corresponds to a power level of the speech signal, and wherein the power level of the logmel feature changes over frames of the logmel feature based on different distances at which the first speaker and the second speaker were positioned from a microphone recording the speech signal;
   one or more processors converting the logmel feature into lossless Mel Frequency Cepstral Coefficients (MFCCs), including a coefficient corresponding to the power level of the logmel feature;
   one or more processors processing the lossless MFCCs so that statistics are normalized for each coefficient of the lossless MFCCs except for the coefficient corresponding to the power level of the logmel feature, resulting in partially normalized lossless MFCCs that include: (i) the coefficients with the normalized statistics, and (ii) the non-normalized coefficient corresponding to the power level of the logmel feature;
   one or more processors converting the partially normalized lossless MFCCs into a partially normalized logmel feature, wherein a power level of the partially normalized logmel feature changes over different frames of the partially normalized logmel feature based on the different distances at which the first speaker and the second speaker were positioned from the microphone recording the speech signal; and
   inputting the partially normalized logmel feature into a speech-to-text system to generate corresponding text data.

2. The method of claim 1, wherein means are normalized as the statistics that are normalized for each coefficient of the lossless MFCCs except for the coefficient of the lossless MFCCs corresponding to the power level of the logmel feature.

3. The method of claim 1, wherein variances are normalized as the statistics that are normalized for each coefficient of the lossless MFCCs except for the coefficient of the lossless MFCCs corresponding to the power level of the logmel feature.

4. The method of claim 1, wherein the obtaining, the processing, and the inputting are performed both in a case where the speech signal is given as data for testing the speech-to-text system and in a case where the speech signal is given as data for training the speech-to-text system.

5. The method of claim 1, wherein the obtaining, the processing, and the inputting are performed in a case where the speech signal is given as data for testing the speech-to-text system.

6. The method of claim 1, wherein the obtaining, the processing, and the inputting are performed in a case where the speech signal is given as data for training the speech-to-text system.

7. A system, the system comprising:
   one or more processors;
   one or more computer readable storage media; and
   program instructions stored on the computer readable storage media for execution by at least one of the one or more processors, the program instructions comprising:
   program instructions to obtain a logmel feature of a speech signal, wherein the speech signal includes utterances by a first speaker and utterances by a second speaker, wherein a power level of the logmel feature corresponds to a power level of the speech signal, and wherein the power level of the logmel feature changes over frames of the logmel feature based on different distances at which the first speaker and the second speaker were positioned from a microphone recording the speech signal;
   program instructions to convert the logmel feature into lossless Mel Frequency Cepstral Coefficients (MFCCs), including a coefficient corresponding to the power level of the logmel feature;
   program instructions to process the lossless MFCCs so that statistics are normalized for each coefficient of the lossless MFCCs except for the coefficient corresponding to the power level of the logmel feature, resulting in partially normalized lossless MFCCs that include: (i) the coefficients with the normalized statistics, and (ii) the non-normalized coefficient corresponding to the power level of the logmel feature;
   program instructions to convert the partially normalized lossless MFCCs into a partially normalized logmel feature, wherein a power level of the partially normalized logmel feature changes over different frames of the partially normalized logmel feature based on the different distances at which the first speaker and the second speaker were positioned from the microphone recording the speech signal; and
   program instructions to input the partially normalized logmel feature into a speech-to-text system to generate corresponding text data.

8. The system of claim 7, wherein means are normalized as the statistics that are normalized for each coefficient of the lossless MFCCs except for the coefficient of the lossless MFCCs corresponding to the power level of the logmel feature.

9. The system of claim 7, wherein variances are normalized as the statistics that are normalized for each coefficient of the lossless MFCCs except for the coefficient of the lossless MFCCs corresponding to the power level of the logmel feature.

10. The system of claim 7, wherein the program instructions to obtain, process, and input are to be executed both in a case where the speech signal is given as data for testing the speech-to-text system and in a case where the speech signal is given as data for training the speech-to-text system.

11. The system of claim 7, wherein the program instructions to obtain, process, and input are to be executed in a case where the speech signal is given as data for testing the speech-to-text system.

12. The system of claim 7, wherein the program instructions to obtain, process, and input are to be executed in a case where the speech signal is given as data for training the speech-to-text system.

13. A computer program product, the computer program product comprising:
one or more computer readable storage media and program instructions stored on the one or more computer readable storage media, the program instructions comprising:
program instructions to obtain a logmel feature of a speech signal, wherein the speech signal includes utterances by a first speaker and utterances by a second speaker, wherein a power level of the logmel feature corresponds to a power level of the speech signal, and wherein the power level of the logmel feature changes over frames of the logmel feature based on different distances at which the first speaker and the second speaker were positioned from a microphone recording the speech signal;
program instructions to convert the logmel feature into lossless Mel Frequency Cepstral Coefficients (MFCCs), including a coefficient corresponding to the power level of the logmel feature;
program instructions to process the lossless MFCCs so that statistics are normalized for each coefficient of the lossless MFCCs except for the coefficient corresponding to the power level of the logmel feature, resulting in partially normalized lossless MFCCs that include: (i) the coefficients with the normalized statistics, and (ii) the non-normalized coefficient corresponding to the power level of the logmel feature;
program instructions to convert the partially normalized lossless MFCCs into a partially normalized logmel feature, wherein a power level of the partially normalized logmel feature changes over different frames of the partially normalized logmel feature based on the different distances at which the first speaker and the second speaker were positioned from the microphone recording the speech signal; and
program instructions to input the partially normalized logmel feature into a speech-to-text system to generate corresponding text data.

14. The computer program product of claim 13, wherein means are normalized as the statistics that are normalized for each coefficient of the lossless MFCCs except for the coefficient of the lossless MFCCs corresponding to the power level of the logmel feature.

15. The computer program product of claim 13, wherein variances are normalized as the statistics that are normalized for each coefficient of the lossless MFCCs except for the coefficient of the lossless MFCCs corresponding to the power level of the logmel feature.

16. The computer program product of claim 13, wherein the program instructions to obtain, process, and input are to be executed both in a case where the speech signal is given as data for testing the speech-to-text system and in a case where the speech signal is given as data for training the speech-to-text system.

17. The computer program product of claim 13, wherein the program instructions to obtain, process, and input are to be executed in a case where the speech signal is given as data for testing the speech-to-text system.

* * * * *